United States Patent
Oertley

(10) Patent No.: US 7,309,186 B2
(45) Date of Patent: Dec. 18, 2007

(54) PIN CARTRIDGE FOR A PIN JOINT

(75) Inventor: Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 492 days.

(21) Appl. No.: 10/436,666

(22) Filed: May 13, 2003

(65) Prior Publication Data

US 2004/0228676 A1    Nov. 18, 2004

(51) Int. Cl.
*F16D 1/00*  (2006.01)
(52) U.S. Cl. ............. 403/288; 403/150; 403/157; 403/158; 403/161; 403/162; 172/810; 37/403
(58) Field of Classification Search ............ 403/34, 403/35, 38, 161, 162, 150, 151, 157, 158, 403/288; 172/810, 811; 37/443, 466, 403; 277/377; 384/295

See application file for complete search history.

(56) References Cited

U.S. PATENT DOCUMENTS

| 3,554,588 | A | * | 1/1971 | Reinsma et al. ............ 403/154 |
|---|---|---|---|---|
| 4,095,909 | A | | 6/1978 | Mackoway |
| 4,096,957 | A | | 6/1978 | Iverson et al. |
| 4,251,182 | A | | 2/1981 | Schroeder |
| 4,398,862 | A | | 8/1983 | Schroeder |
| 4,491,436 | A | | 1/1985 | Easton |
| 4,668,025 | A | | 5/1987 | Macdonald |
| 4,772,150 | A | | 9/1988 | Horton |
| 4,961,667 | A | | 10/1990 | Reinsma et al. |
| 5,044,812 | A | | 9/1991 | Ardelt et al. |
| 5,630,673 | A | | 5/1997 | Krzywanos et al. |
| 5,769,557 | A | | 6/1998 | Beals et al. |
| 5,961,141 | A | | 10/1999 | Goel |
| 5,993,138 | A | | 11/1999 | Anderson et al. |
| 6,283,667 | B1 | * | 9/2001 | Neitzel ................ 403/158 |
| 6,322,280 | B1 | | 11/2001 | Coyne |
| 6,382,742 | B1 | | 5/2002 | Hasselbusch et al. |
| 6,485,116 | B1 | | 11/2002 | Oertley |

* cited by examiner

*Primary Examiner*—Daniel P. Stodola
*Assistant Examiner*—Michael P. Ferguson
(74) *Attorney, Agent, or Firm*—Jeff A. Greene

(57) ABSTRACT

A frame for a work machine includes first and second wall portions having an axially aligned bore positioned therein. A boom is positioned between the first and second wall portions and has a bore that is alignable with the bores in the first and second wall portions. A first insert is disposed within the bore of the first wall portion of the frame and a second insert disposed within the bore of the second wall portion of the frame with each insert having a bore therethrough. A pin cartridge assembly is positioned in the bores of the first and second inserts and the boom. The pin cartridge assembly includes a pin having first and second end portions and an outer surface. A first collar having a through bore and a counter bore at one end, the collar is disposed about the outer surface of the pin. A second collar having through bore and a counter bore at one end, the collar is disposed about the outer surface of the pin. A bushing has a stepped bore that is rotatably disposed about the outer surface of the pin. A pair of sleeve bearings, one each being interposed the counter bore of the first and second collars and the stepped bore of the bushing.

21 Claims, 3 Drawing Sheets

PIN CARTRIDGE FOR A PIN JOINT

TECHNICAL FIELD

This invention relates generally to a pin joint and more particularly to a sealed and lubricated pin cartridge.

BACKGROUND

In construction machines with material handling capabilities, such as, wheel loaders, backhoe loaders and the like, pin joints are well known for attaching a lift arm or boom to the frame of the machine for utilization of a bucket or other implement. Generally, pin joints used for this function create forces on surrounding structure due to the relative movement of the lift arm or boom around the pin. Additionally, the pin may be deflected into point contact with the surrounding structure in such a manner that the pin is damaged. Managing the damaging effects of these forces and pin deflection usually requires the use of longer length to diameter bearing assemblies and larger pin diameters. Furthermore, joints must be lubricated at regular intervals in order to protect the pin joint from damage. Unfortunately, the lubrication of the pin joint must be completed every few hours during operation, which requires the time and energy of the operator. The operator also has the burden of maintaining this lubrication schedule without fail because of the potential harm that may occur to the machine.

One such design is disclosed in U.S. Pat. No. 5,769,557 issued on Jun. 23, 1998 to Charles E. Beals et al and is assigned to the owner of the present application. This design uses a sealed and lubricated pin joint with a profiled pin. The profiled pin is designed to make a line contact with the bearing and bushing components so as not to gall or gauge the pin.

The present invention is directed to overcoming the problems as set forth above.

SUMMARY OF THE INVENTION

In one aspect of the present invention a pin cartridge assembly is provided for a pin joint. The pin cartridge includes a pin that has first and second end portions and an outer surface. A first collar has a through bore and a counter bore at one end. The collar is disposed about the outer surface of the pin. A second collar has a through bore and a counter bore at one end. The second collar is disposed about the outer surface of said pin. A bushing has a stepped bore is rotatably disposed about the outer surface of the pin. One each of a pair of sleeve bearings is positioned interposed the counter bore of the first and second collars and the stepped bore of the bushing.

DETAILED DESCRIPTION

Figure 1:
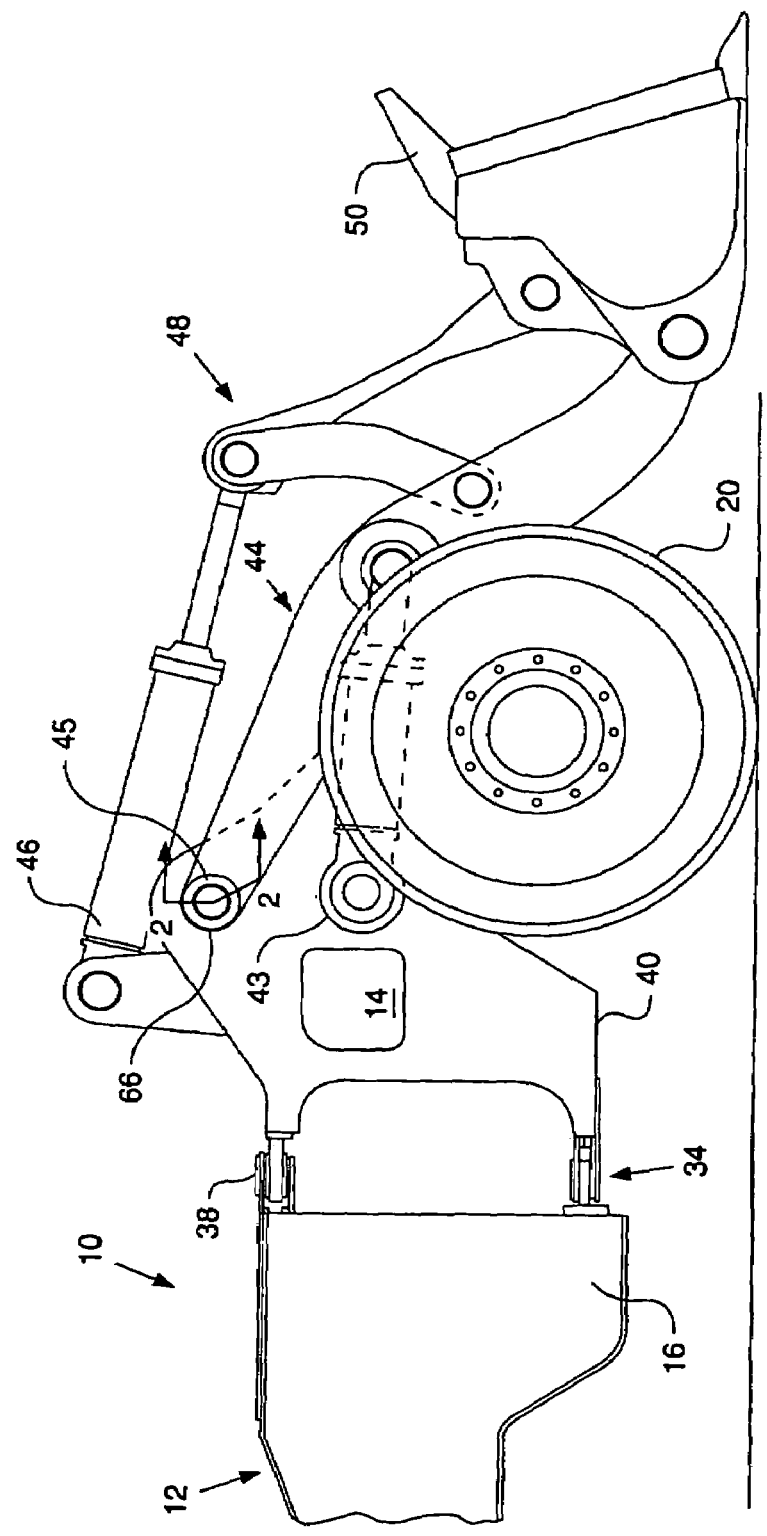
FIG. 1 is a diagrammatic view of a construction machine featuring a lift arm assembly embodying the present invention.

Referring now to the drawings and in particular to FIG. 1 a work machine is shown generally with reference 10. In this example work machine 10 is shown as being a wheel loader however it should be understood that other work machines, such as excavators, material handlers and the like may utilize the components described herein. Work machine 10 has a structural frame 12 with a front portion 14 and a rear portion 16. A plurality of ground supporting members 20 are connected to the front portion 14, one of which is shown, and the rear portion 16 of the structural frame 12 through axles, drive shafts or other means (not shown).

Figure 2:
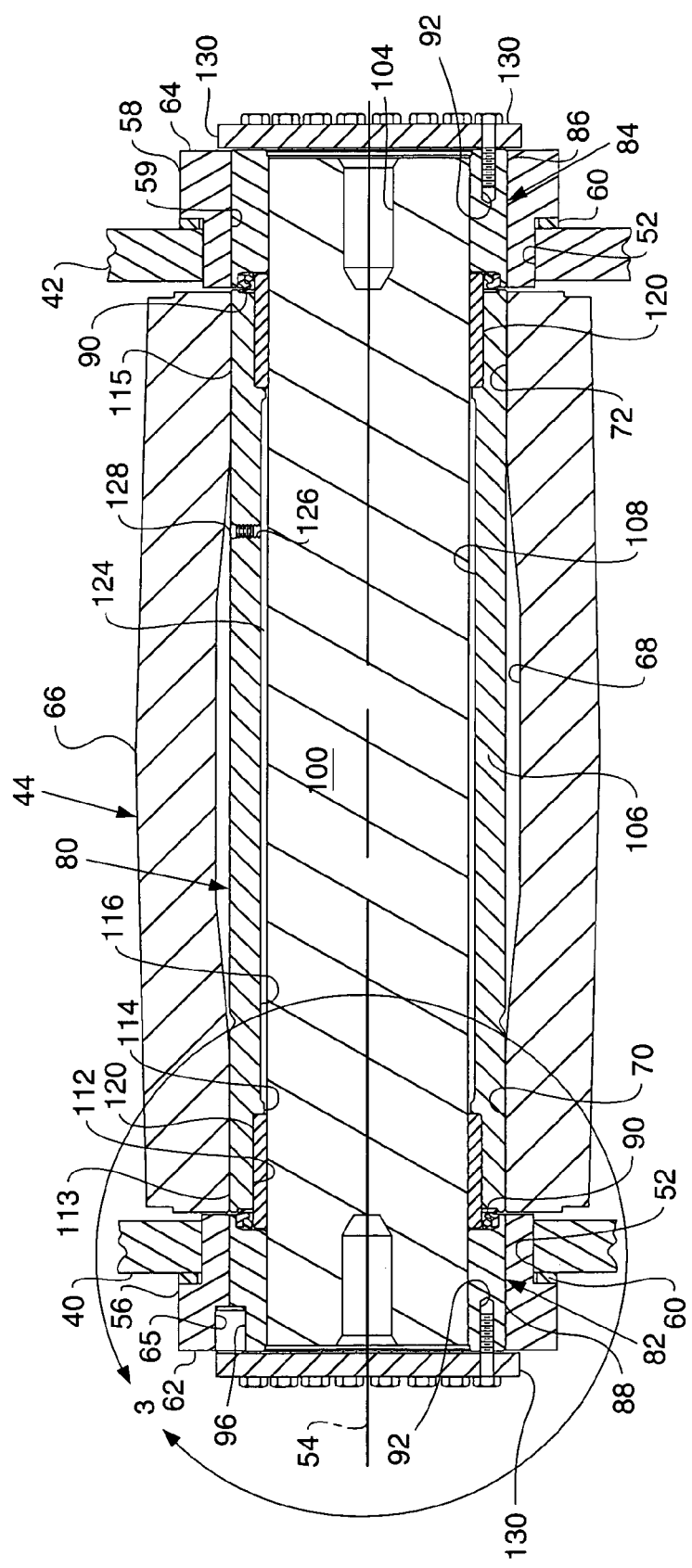
FIG. 2 is a diagrammatic view of a pin joint assembly taken along line 2-2 of FIG. 1.

A hitch arrangement 34 pivotally connects the front portion 14 to the rear portion 16 by way of a pair hinge joints 38. The front portion 14 of the frame 12 includes spaced apart first and second wall portions 40,42 as best seen in FIG. 2. A lift arm assembly/boom 44 is pivotally connected to the front portion 14 of the frame 12 by a pin joint 45, with a lift cylinder 43 pivotally connected between the front portion 14 of the frame 12 and the lift arm assembly/boom 44. A tilt cylinder 46 is connected between the front portion 14 and a linkage arrangement 48. The boom 44, the lift cylinder 43, the tilt cylinder 46 and the linkage arrangement 48 provide the means to raise, lower and angle an implement 50 attached, such as a bucket, during loading and unloading operations.

Figure 3:
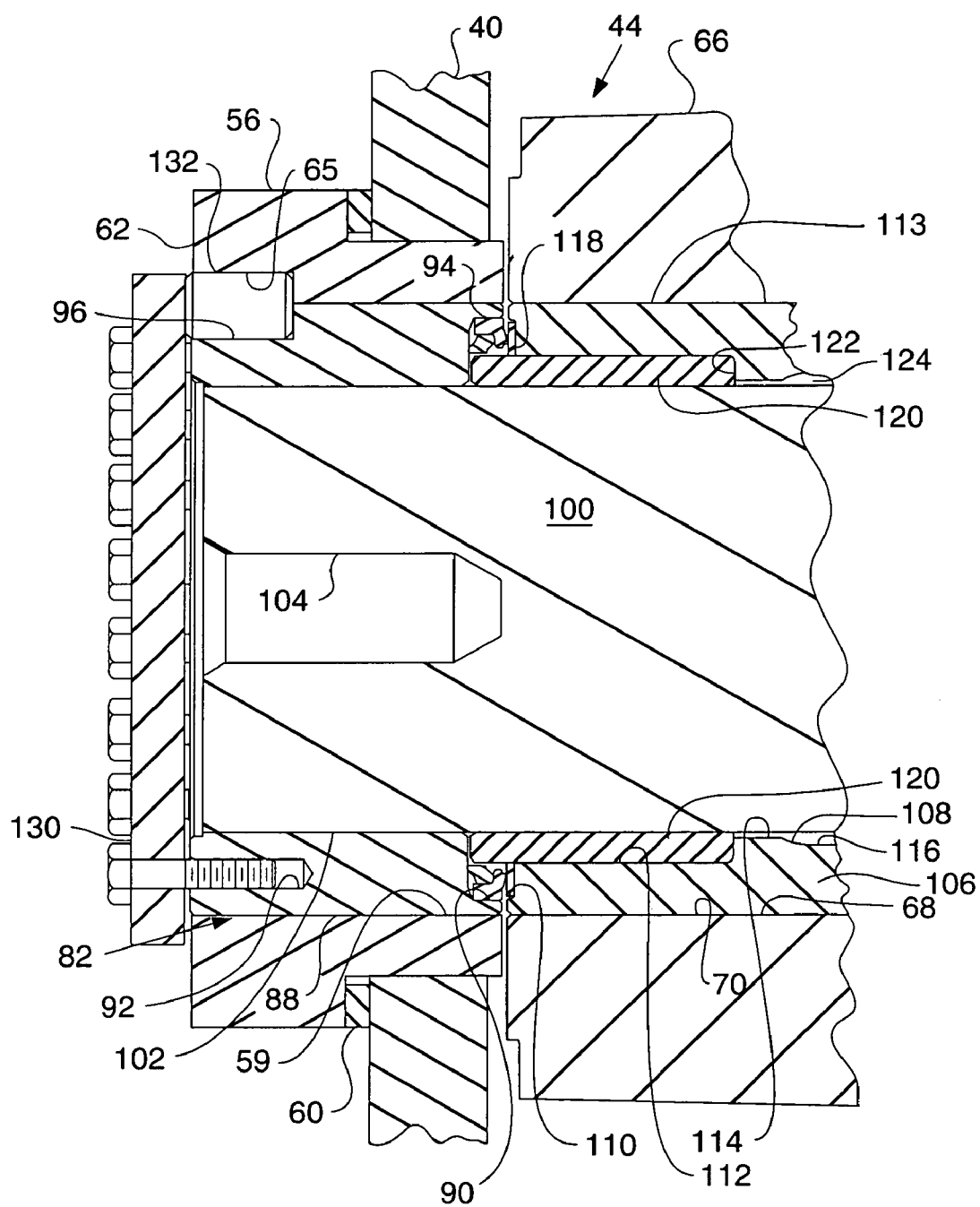
FIG. 3 is an enlarged view of a seal assembly within the pin joint assembly, which is taken around line 3-3 in FIG. 2.

Referring now to FIG. 2, the first and second wall portions 40,42 each have a bore 52 positioned therein, with the bore 52 in the first wall portion 40 being axially aligned with the bore 52 in the second wall portion 42 and thus defining a central axis 54. A first insert 56 is positioned in the first wall portion 40 and a second insert 58 is positioned in the second wall portion 42. First and second inserts 56,58 are generally cylindrical hat shaped and include a bore 59. The bores 59 of the first and second inserts 56,58 coaxially align with the central axis 54. The smaller outer diameter of the inserts 56,58 is maintained within bores 52 by an interference press fit, welding or other manner to assure there is no rotation relative to the first and second portions 40,42. Shims 60 are positioned between the first and second inserts 56,58 and the first and second wall portions 40,42 respectively. Shims 60 are used during assembly to assure the distance, between the outside surface 62 of the first insert 56 and the outside surface 64 of the second insert 58, is held to a predetermined distance. First insert 56 also includes a plurality of half-bores 65 evenly spaced within-bore 59 and extending inward from the outside surface 62. An end portion 66 of the boom 44, opposite the implement 50, includes a bore 68 and has first and second bearing portions 70,72. The second bearing portion 72 is smaller in diameter that the first bearing portion 70. The dimensional differences aid in assembly and will be explained in greater detail later A pin cartridge assembly 80 is used to pivotally mount the boom 44 within the bores 59 of the first and second inserts 56,58, respectively. The pin cartridge assembly 80 includes first and second collars 82,84 fitted within the bores 59, in a suitable manner, such as by loose slip fit. It should be noted that the bore 59 of the second insert 58 is smaller in diameter than the bore 59 of the first insert 56. An outside diameter 86 of the second collar 84 is slightly smaller in diameter than an outside diameter 88 of the first collar 82. These dimensional differences aid in assembly and will be explained in greater detail later. The first and second collars 82,84 have a counter bore 90 positioned in one end and a plurality of threaded apertures 92 positioned on the opposing end thereof, as is best viewed in FIG. 3. A face seal 94 is positioned within each of the counter bores 90. The first collar 82 additionally has a plurality of half bores 96 positioned between the plurality of threaded apertures 92 and align with the half bores 65 of the first insert 56.

The first and second collars 82,84 are press fit on opposite ends of a pin 100 and are retained there as by welding or other suitable manner. Pin 100 has an outer surface 102 and a threaded aperture 104 positioned in the opposite ends thereof. A bushing 106 is rotatably disposed about the pin 100 between the first and second collars 82,84. The bushing 106 includes a stepped bore 108 extending there through. Starting from the opposite ends of the bushing 106 and moving centrally inward the stepped bore 108 includes first, second, third and forth bores 110,112,114,116. The first bore 110 has a larger diameter than the second and third bores 112,114. A hardened washer 118 having a suitable corrosion and abrasion resistant coating applied thereto is press fit into the first bore 110. A bearing sleeve 120 is disposed with a loose fit within each of the second bores 112. The third bore 114 is slideably disposed about the outer surface 102 of pin 100 and creates a shoulder 122 positioned adjacent to one end of each sleeve bearing 120. The fourth bore 116 is larger in diameter than the third bore 114 and creates a cavity 124 for retaining suitable lubricating oil. Bushing 106 additionally, includes an outer surface 111 having a first outer portion 113 and a second outer portion 115. The second outer portion 115 is smaller in diameter that the first outer portion 113. Again these dimensional differences aid in assembly and will be explained in greater detail later. A threaded bore 126 extends from the outer surface 111 inward to the fourth bore 116 of the bushing 106. A plug 128 is threadably disposed within the threaded bore 126 so as to retain the lubricating oil.

Each bearing sleeve 120 has a predetermined length and extends axially from the shoulder 122 of the bushing 106 radially inward from the face seals 94 and adjacent the bottom of the counter bore 90 of the first and second collars 82,84.

Retainers 130 are fastened to opposite ends of the pin cartridge 80 as by fasteners positioned within the plurality of threaded apertures 92. A plurality of dowels 132 are positioned within the half bores 65 of the first insert 56 and the plurality of half bores 96 of the first collar 92. Retainers 130 are drawn against the outer surface 62 of the first insert 56 and the outer surface 64 of the second insert 58 in the final assembled state.

INDUSTRIAL APPLICABILITY

The pin cartridge 80 is pre-assembled lubricating oil is introduced into cavity 124 and plug 128 is placed into threaded bore 126 so that lubricating fluid surrounds the outer surface 102 of the pin 100 in a well-known manner. The cavity 124 acts as a self-contained oil reservoir.

With the retainer 130 being removed from the second collar 86, the second collar 86 can be placed in the bore 59 of the first insert 56. The dimensional differences of the bores 59 of the first and second inserts 56, 58 the outside diameters 88,86 of the first and second collars 82,84 and the first and second end portions 113,115 of bushing 106 and the inside diameter of the first and second bearing portions 70,72 of the boom 44, allow the pin cartridge to positioned through the first and second inserts 56,58 and the bore 68 of the boom almost ninety percent of the way. At this point a mechanical press (not shown) is threaded into the threaded aperture 104 of the pin 100. The press can then pull the pin cartridge 80 the remaining distance due to the different diameters of the first and second collars 82,84 and the first and second end portion 113,115 of the bushing 106 and the inside diameters of the first and second inserts 56, 58 and the first and second bearing portions 70,72 of the bore 68 of boom 44 as explained above. The remaining retainer 130 is then removed from the first collar 82 and the pin cartridge is rotated until the half bores 65,96 of the first insert 56 and the first collar 82 are aligned. A plurality of dowels 132 are then placed between the first insert 56 and the first collar 82 and the retainers 130 are then replaced.

During operation of the work machine 10, the pin 100 is restricted from moving axially by retainers 130 and restricted from rotating in relation to the first and second wall portions 40,42 of the front portion 14 of the frame 12 by the dowels 132. However, the boom 44 pivots about the pin 100 due to a press fit of bushing 106 into first and second bearing portions 70,72 of the bore 68 to achieve specific movements of the implement 50. The pivoting motion may cause the pin 100 to deflect. Due to the loose fit between the outer surface 102 of the pin 100 and the sleeve bearing 120 and the second bore 112 of the bushing and the limited axial movement of the sleeve bearings 102 and the shoulder 132 and the bottom of the counter bore 90 lubricating oil continuously lubricates all of these components. Thus reducing galling and gouging of the pin 100.

The face seals 94 prevent oil within the pin cartridge 80 from escaping through the first and second collars 82,84 and the bushing 106. Sleeve bearings 120 further aid in limiting axial movement of the bushing 106 and limiting loading of face seals 94. The hardened washers 118 additionally resist wear and corrosion further aiding in premature lose of lubricating oil.

It should be understood that the ability to utilize oil within the pin cartridge 80 increases the load and energy capability of the system due to the improved lubrication at sleeve bearings 120 the bushing 106 and pin 100 interface. The improved lubrication, in turn, allows for the use of shorter length to diameter sleeve bearings 120. Shorter length to diameter of the sleeve bearings 120 reduces the bending moments generated in the pin 100. Additionally, sealing the oil within the pin cartridge 80 virtually eliminates daily lubrication requirements.

Other aspects, objects, and advantages of this invention can be obtained from a study of the drawings, the disclosure and the appended claims.

What is claimed is:

1. A pin cartridge assembly, for pivotally connecting a boom to a frame of a machine, the frame having first and second wall portions each having an axially aligned bore therein, the boom having a bore therein alignable with the bore in the first and second wall portions, the pin cartridge assembly comprising:
   a pin having first and second end portions and an outer surface;
   a first collar receivable within the bore in the first wall portion, said first collar having a through bore and a counter bore at one end, said collar being disposed about the outer surface of said pin;
   a second collar receivable within the bore in the second wall portion, said second collar having a through bore and a counter bore at one end, said collar being disposed about the outer surface of said pin;
   a bushing receivable within the bore in the boom, said bushing having a stepped bore, said bushing being rotatably disposed about the outer surface of said pin;
   a pair of sleeve bearings, one each of said sleeve bearings being positioned interposed said counter bore of a one of said first and second collars and the stepped bore of said bushing and forming a seal between said collars and said bushing;

wherein said first and second collars being rigidly secured about said first and second end portions of said pin so as to maintain said first and second collars, said bushing, said pair of sleeve bearings and said pin in a unitary sealed assembly prior to being received within the bore of the first and second wall portions and the bore of the boom.

2. The pin cartridge assembly of claim 1, including a face seal being positioned in the counter bore of each of said first and second collars, each of said face seals being positioned to seal against an end face of said bushing.

3. The pin cartridge assembly of claim 2, wherein said face seal seals against a hardened washer, said washer being press fit into a first bore in said bushing.

4. The pin cartridge assembly of claim 1, wherein one end of each of said sleeve bearings is positioned adjacent a shoulder in a second bore of said bushing and the opposite end is positioned adjacent a bottom of said counter bore of a one of said first and second collar.

5. The pin cartridge assembly of claim 1, wherein said first and second collars being positioned into first and second inserts, respectively, said first and second inserts being positioned in a frame member of a work machine.

6. The pin cartridge assembly of claim 5, wherein a plurality of dowels are positioned within a plurality of half-bores in said first insert and a plurality of half-bores in said first collar, said dowels preventing relative movement of said pin cartridge to said frame member.

7. The pin cartridge assembly of claim 6, wherein said bushing includes first and second end portions that are press fit into first and second bearing portions of a bore in a boom.

8. The pin cartridge assembly of claim 7, including a retainer connected to an outer surface of said first insert and a retainer connected to an outer surface of said second insert.

9. The pin cartridge assembly of claim 1, wherein said bushing defines a cavity positioned interposed said stepped bore and the outer surface of said pin, said cavity containing lubricating oil.

10. The pin cartridge assembly of claim 9, wherein a threaded bore extends from the outer surface of said bushing to said stepped bore.

11. The pin cartridge assembly of claim 1, wherein said first collar is secured to the first end portion of said pin and said second collar is secured to the second end portion of said pin.

12. A pin joint for a work machine, comprising:
a frame having first and second wall portions, each of the first and second wall portions having an axially aligned bore positioned therein;
a boom having a bore positioned therein and being alignable with said bore in the first and second wall portions;
a first insert disposed within the bore of the first wall portion of the frame and a second insert disposed within the bore of the second wall portion of the frame with each insert having a bore therethrough;
a pin cartridge assembly being positioned in said bore of said first and second insert and said bore of said boom, said pin cartridge assembly including:
a pin having first and second end portions and an outer surface;
a first collar having a through bore and a counter bore at one end, said collar being disposed about the outer surface of said pin;
a second collar having a through bore and a counter bore at one end, said collar being disposed about the outer surface of said pin;
a bushing having a stepped bore, said bushing being rotatably disposed about the outer surface of said pin;
a pair of sleeve bearings, one each of said sleeve bearings being positioned interposed said counter bore of a one of said first and second collars and the stepped bore of said bushing and forming a seal between said collars and said bushing;
wherein said first and second collars being rigidly secured about said first and second end portions of said pin so as to maintain said first and second collars, said bushing, said pair of sleeve bearings and said pin in a unitary sealed assembly prior to being received within said bore of said first and second inserts and said bore of said boom.

13. The pin joint of claim 12, including a face seal being positioned in the counter bore of each of said first and second collars, each of said face seals being positioned to seal against an end face of said bushing.

14. The pin joint of claim 13, wherein said face seal seals against a hardened washer, said washer being press fit into a first bore in said bushing.

15. The pin joint of claim 12, wherein one end of each of said sleeve bearings is positioned adjacent a shoulder in a second bore of said bushing and the opposite end is positioned adjacent a bottom of said counter bore of a one of said first and second collar.

16. The pin joint of claim 12, wherein a plurality of dowels are positioned within a plurality of half-bores in said first insert and a plurality of half-bores in said first collar, said dowels preventing relative movement of said pin cartridge to said frame member.

17. The pin joint of claim 16, wherein said bushing includes first and second end portions that are press fit into first and second bearing portions of a bore in said boom.

18. The pin joint of claim 17, including a retainer connected to an outer surface of said first insert and a retainer connected to an outer surface of said second insert.

19. The pin joint of claim 12, wherein said bushing defines a cavity positioned interposed said stepped bore and the outer surface of said pin, said cavity containing lubricating oil.

20. The pin joint of claim 19, wherein a threaded bore extends from the outer surface of said bushing to said stepped bore.

21. The pin joint of claim 12, wherein said first collar is secured to the first end portion of said pin and said second collar is secured to the second end portion of said pin.

* * * * *